United States Patent
Choi et al.

(10) Patent No.: US 9,728,766 B2
(45) Date of Patent: Aug. 8, 2017

(54) POUCH TYPE LITHIUM SECONDARY BATTERY HAVING TUBULAR PASSAGE STRUCTURE

(71) Applicant: SK INNOVATION CO., LTD., Seoul (KR)

(72) Inventors: Ju-Young Choi, Daejeon (KR); Ru-Ri Lee, Daejeon (KR); Chang-Mook Hwang, Daejeon (KR)

(73) Assignee: SK Innovation Co., LTD., Seoul (KR)

( * ) Notice: Subject to any disclaimer, the term of this patent is extended or adjusted under 35 U.S.C. 154(b) by 144 days.

(21) Appl. No.: 14/802,881

(22) Filed: Jul. 17, 2015

(65) Prior Publication Data
US 2016/0020452 A1    Jan. 21, 2016

(30) Foreign Application Priority Data
Jul. 18, 2014    (KR) .................. 10-2014-0091192

(51) Int. Cl.
| | |
|---|---|
| *H01M 2/12* | (2006.01) |
| *H01M 2/36* | (2006.01) |
| *H01M 10/052* | (2010.01) |
| *H01M 2/02* | (2006.01) |

(52) U.S. Cl.
CPC ........... *H01M 2/36* (2013.01); *H01M 2/0212* (2013.01); *H01M 2/1223* (2013.01); *H01M 2/1229* (2013.01); *H01M 10/052* (2013.01)

(58) Field of Classification Search
CPC .... H01M 2/36; H01M 10/052; H01M 2/1223; H01M 2/1229; H01M 2/0212; Y02P 70/54
USPC ......................................... 429/53
See application file for complete search history.

(56) References Cited

U.S. PATENT DOCUMENTS

2010/0227209 A1*   9/2010   Kim .................. H01G 9/038
                                                       429/94

FOREIGN PATENT DOCUMENTS

KR    1020130102807      9/2013

* cited by examiner

*Primary Examiner* — Gary Harris
(74) *Attorney, Agent, or Firm* — IP & T Group LLP

(57) ABSTRACT

Provided is a pouch type lithium secondary battery having a tubular passage structure. The pouch type lithium secondary battery having a tubular passage structure includes: a tubular passage structure having a passage of injecting an electrolyte from an outer portion of a pouch and discharging gas from an inner portion of the pouch by communicating the inner portion of the pouch with the outer portion of the pouch.

8 Claims, 10 Drawing Sheets

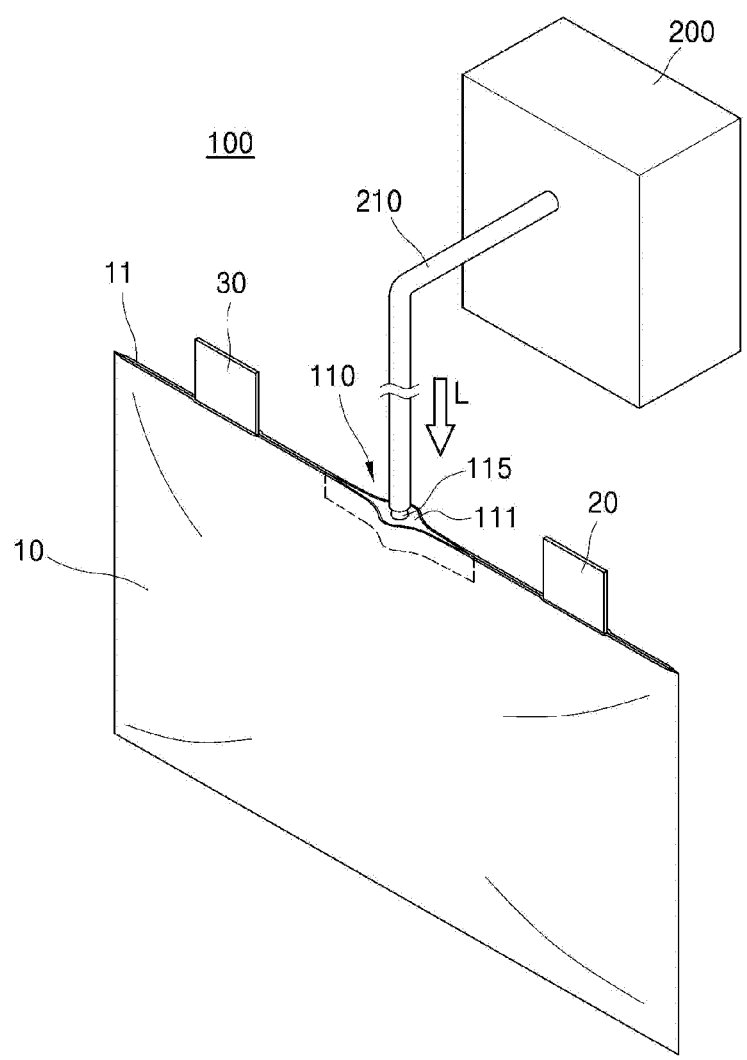

POUCH TYPE LITHIUM SECONDARY BATTERY HAVING TUBULAR PASSAGE STRUCTURE

CROSS REFERENCE TO RELATED APPLICATION

This application claims the benefit of Korean Patent Application No. 10-2014-0091192, filed on Jul. 18, 2014, entitled "POUCH TYPE LITHIUM SECONDARY BATTERY HAVING TUBULAR PASSAGE STRUCTURE", which is hereby incorporated by reference in its entirety into this application.

TECHNICAL FIELD

The present invention relates to a pouch type lithium secondary battery having a tubular passage structure, and more specifically, to a pouch type lithium secondary battery having a tubular passage structure, capable of simplifying a manufacturing process of the lithium secondary battery, injecting an additional electrolyte, and improving performance in the long term.

BACKGROUND ART

As known in the art, a secondary battery refers to a battery capable of being charged and discharged, unlike a primary battery which is not possible to be charged.

As an example, a low capacity battery in which one battery cell is packaged in a pack form has been mainly used in small portable electronic devices such as a portable terminal, a note book, a computer, and a camcorder. As another example, a large capacity secondary battery in which a plurality of battery cells are connected in series or in parallel has been used in devices requiring high power, for examples, power supply for driving motor of an electric vehicle, and the like.

The secondary battery is possible to be manufactured in various shapes. As representative examples, the secondary battery is manufactured in a pouch-shape, a cylindrical shape, and a prismatic shape, and the like, Among them, the pouch type secondary battery is relatively free in view of a shape, and has a light weight, to be widely used in portable electronic devices requiring slimness and lightweight in recent years, and in an electric vehicle, and the like, in addition thereto.

FIG. 1 is a perspective view schematically showing a general pouch type lithium secondary battery.

Referring to FIG. 1, the general pouch type lithium secondary battery (1) is provided with a pouch packing material (hereinafter, referred to as a "pouch" 10) that is sealed along an edge. The pouch 10 includes a thin metal film and insulating films attached on both surfaces thereof to be freely bendable.

In addition, electrode laminates (not shown) are embedded in the pouch 10, and in order to embed the electrode laminates in the pouch 10, a predetermined space part for accommodating the electrode laminates may be formed in an inner portion of the pouch 10.

Meanwhile, a pair of electrode tabs 20 and 30 protrude toward an outer portion of the pouch 10, and these electrode tabs 20 and 30 may be electrically connected to the electrode laminates embedded in the pouch 10. However, the general pouch type lithium secondary battery further includes a gas chamber separately, in order to remove gas generated in a pre-charge process after an electrolyte is injected. In addition, when the gas is removed by a degassing process, it is required to remove the gas chamber and to reseal an open region. Accordingly, there is possibility of causing problems such as scattering of electrolyte, sealing defect, insulation resistance defect, and the like, such that a large amount of time is required for optimization of process conditions.

In addition, in the general pouch type lithium secondary battery, gas may be generated in a deterioration process. Here, when an amount of the gas generated by the deterioration process is more than a predetermined amount of the gas, appearance deformation of the pouch may be caused. As a result, the electrode laminates accommodated in the inner portion of the pouch are out of an initially arranged state and disorderly arranged, and in a worse case, short-circuit may occur therebetween to cause smoke or ignition. In spite of the above-described problems, a cell obtained after the resealing process is finished is completely blocked and sealed from the outside, such that additional injection of the electrolyte is hardly achieved, and it is difficult to discharge the gas that is generated by the deterioration process to the outside.

Korean Patent Laid-Open Publication No. 10-2013-0102807 (Publication Date: Sep. 23, 2013) which is a relevant prior art discloses a lithium polymer secondary battery.

DISCLOSURE

Technical Problem

An aspect of the present invention is to provide a pouch type lithium secondary battery having a tubular passage structure, capable of simplifying a manufacturing process of the pouch type lithium secondary battery, performing maintenance and repairing in the long term to improve performance.

In addition, another aspect of the present invention is to provide a pouch type lithium secondary battery having a tubular passage structure, capable of maintaining a state in which an entire surface of a pouch is sealed from the outside and injecting an electrolyte.

Further, another aspect of the present invention is to provide a pouch type lithium secondary battery having a tubular passage structure, capable of properly removing gas generated after pre-charge to be discharged to the outer portion of the pouch.

However, technical problems to be achieved in the present invention are not limited to the above-mentioned problems, and other problems will be clearly understood to those skilled in the art from the following descriptions.

Technical Solution

In accordance with one aspect of the present invention, a pouch type lithium secondary battery having a tubular passage structure includes: a tubular passage structure having a passage of injecting an electrolyte from an outer portion of a pouch and discharging gas from an inner portion of the pouch by communicating the inner portion of the pouch with the outer portion of the pouch.

At least one tubular passage structure may be included in a sealing part of the pouch.

The tubular passage structure may be positioned among a plurality of electrode tabs.

The pouch type lithium secondary battery having a tubular passage structure may further include: a locking member controlling opening and closing of the tubular passage structure.

The tubular passage structure may include a wing-shaped body part inserted between sealing parts of the pouch to attach both surfaces of the body part to the sealing part; and a hollow part penetrated through the body part to communicate the inner portion of the pouch with the outer portion of the pouch.

The pouch type lithium secondary battery having a tubular passage structure may further include: a protruding extension part protruding outwardly of the body part and having an inner hollow communicated with the hollow part.

The protruding extension part may be connected and fixed to an electrolyte injection line that injects an electrolyte into the inner portion of the pouch, or may be connected and fixed to a gas discharge line that discharges gas to the outer portion of the pouch.

The protruding extension part may include fixing protrusions formed on an outer peripheral surface thereof, and the fixing protrusion may have a structure in which the protruding extension part inserted into the electrolyte injection line or the gas discharge line is prevented from being separated and detached.

At least one fixing protrusion may be included in a length direction of the protruding extension part, and may have cone-shaped steps each longer than an outer diameter of the protruding extension part.

Advantageous Effects

According to the present invention, a manufacturing process of the pouch type lithium secondary battery may be simplified, and maintenance and repairing in the long term may be performed to improve performance of the pouch type lithium secondary battery.

For example, since the gas chamber is not required, a process of forming and manufacturing of the gas chamber may be omitted, and a piercing process in degassing is not required, which contributes to reduction of defects. In addition, a resealing process may be excluded to improve working time and working efficiency.

Further, the tubular passage structure may be used to inject an electrolyte while maintaining a state in which the entire surface of the pouch is sealed from the outside.

For example, uniformity of an injected amount of the electrolyte may be secured, and air, foreign materials, moisture, and the like, from the outer portion of the pouch may be prevented from being introduced into the inner portion of the pouch. In addition, in a process of injecting the electrolyte, the electrolyte that may remain in a portion which is not included in a final cell may be minimized to provide uniform production capacity. Further, sealing defect occurrence of a resealing region caused by the residual electrolyte may be suppressed.

In addition, gas generated after precharge of the pouch type lithium secondary battery may be properly discharged to the outer portion of the pouch, by using the tubular passage structure.

For example, the degassing process may be performed by directly connecting vacuum pump to the tubular passage structure. In this case, only the corresponding part of the cell is possible to be in a vacuum state to perform the degassing process, thereby reducing loss as compared to the existing method in which the entire chamber needs to be in a vacuum state to perform the degassing process.

Further, maintenance and repairing in the long term may be performed on the pouch type lithium secondary battery.

DESCRIPTION OF DRAWINGS

FIG. 5 is a process diagram schematically showing a process in which an electrolyte is injected into the pouch type lithium secondary battery having a tubular passage structure according to an exemplary embodiment of the present invention.

BEST MODE

Figure 1:
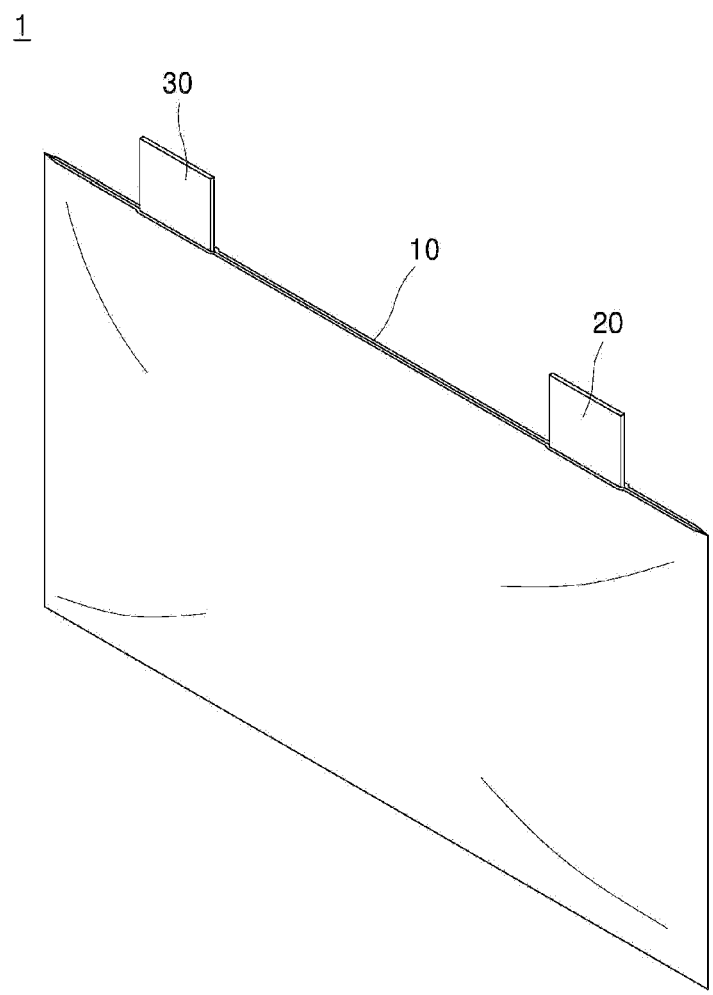
FIG. 1 is a perspective view schematically showing a general pouch type lithium secondary battery.

Advantages and features of the present invention and methods to achieve them will be elucidated from exemplary embodiments described below in detail with reference to the accompanying drawings. However, the present invention is not limited to the exemplary embodiments disclosed herein but will be implemented in various forms. The exemplary embodiments are provided by way of example only so that a person of ordinary skill in the art can fully understand the disclosures of the present invention and the scope of the present invention. Therefore, the present invention will be defined only by the scope of the appended claims. The same reference numerals refer to the same components throughout the specification.

However, in describing the exemplary embodiments of the present invention, detailed descriptions of well-known functions or constructions are omitted so as not to obscure the description of the present invention with unnecessary detail. Further, the following terminologies are defined in consideration of the functions in the present invention and may vary in different ways by the intention of users and operators. Therefore, the definitions thereof should be construed based on the contents throughout the specification.

Hereinafter, a pouch type lithium secondary battery having a tubular passage structure according to exemplary embodiments of the present invention will be described in detail with reference to the accompanying drawings.

Figure 2:
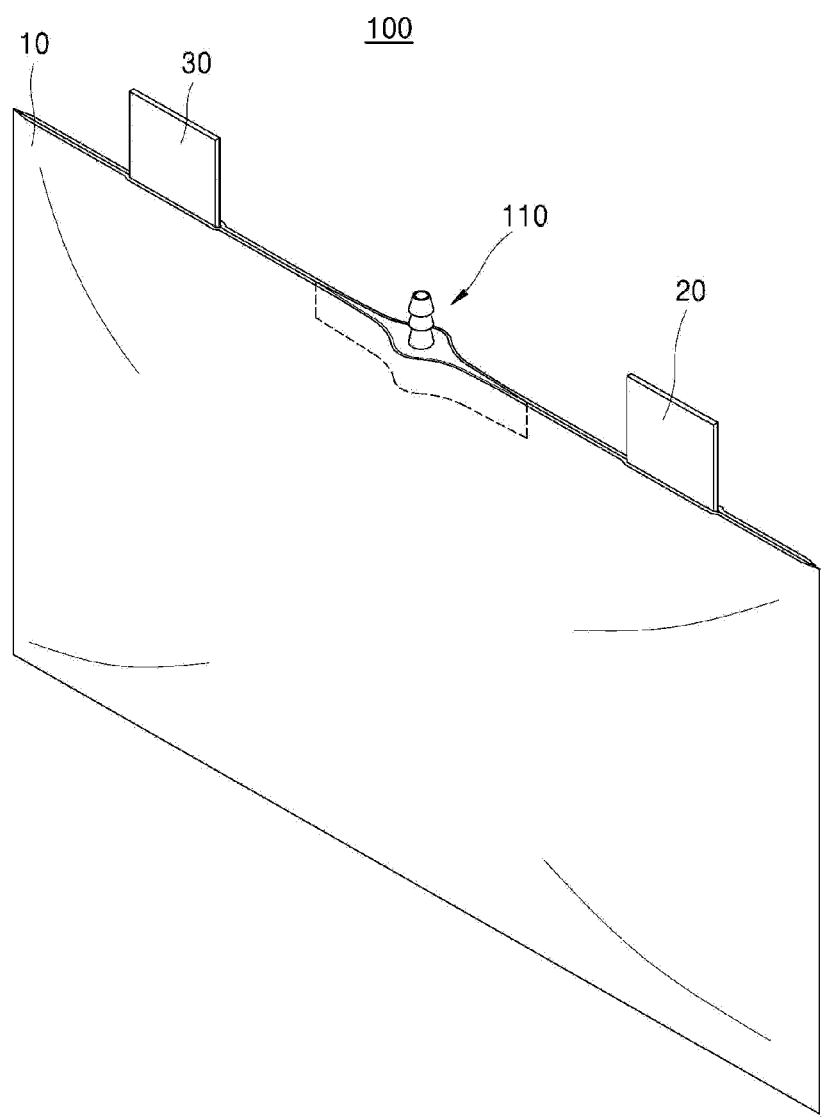
FIG. 2 is a perspective view schematically showing a pouch type lithium secondary battery having a tubular passage structure according to an exemplary embodiment of the present invention.

FIG. 2 is a perspective view schematically showing a pouch type lithium secondary battery having a tubular passage structure according to an exemplary embodiment of the present invention.

Referring to FIG. 2, the pouch type lithium secondary battery having a tubular passage structure (hereinafter, referred to as a 'pouch type lithium secondary battery' 100) includes a tubular passage structure 110.

The pouch type lithium secondary battery 100 includes a pouch 10 sealed along an edge, electrode laminates (not shown) embedded in an inner accommodation area of the pouch 10, and at least one pair of electrode tabs 20 and 30 protruding toward an outer portion of the pouch 10.

The pouch 10 may be configured of a thin metal film and insulating films attached on both surfaces thereof, but the present invention is not necessarily limited to the pouch with the above-described configuration.

In addition, the electrode laminates may be embedded in the pouch 10. Although specific shapes of the electrode laminates are not separately shown, the electrode laminate is not limited in view of a shape, but the shape of the electrode laminate may be variously changed.

The electrode tabs 20 and 30 may be electrically connected to the electrode laminates embedded in the inner accommodation area of the pouch 10, and may protrude toward the outer portion of the pouch 10 through a sealing part of the pouch 10.

The pouch type lithium secondary battery 100 configured as above may include a tubular passage structure 110.

The tubular passage structure 110 may be formed to communicate the inner portion of the pouch 10 with the outer portion of the pouch 10.

The tubular passage structure 110 may serve to provide a passage of injecting an electrolyte from the outer portion of the pouch 10 into the inner accommodation area (that is, an electrolyte injection passage).

In addition, the tubular passage structure 110 may serve to provide a passage of discharging gas from the inner portion of the pouch 10 to the outer portion of the pouch 10 (that is, a gas discharge passage).

Meanwhile, at least one tubular passage structure 110 may be included in the sealing part of the pouch 10, that is, a part that is sealed along an edge of the pouch 10.

In addition, the tubular passage structure 110 may be disposed among at least one of the electrode tabs 20 and 30. Meanwhile, the tubular passage structure 110 is not necessarily limited to the above-described arrangement.

Figure 3:
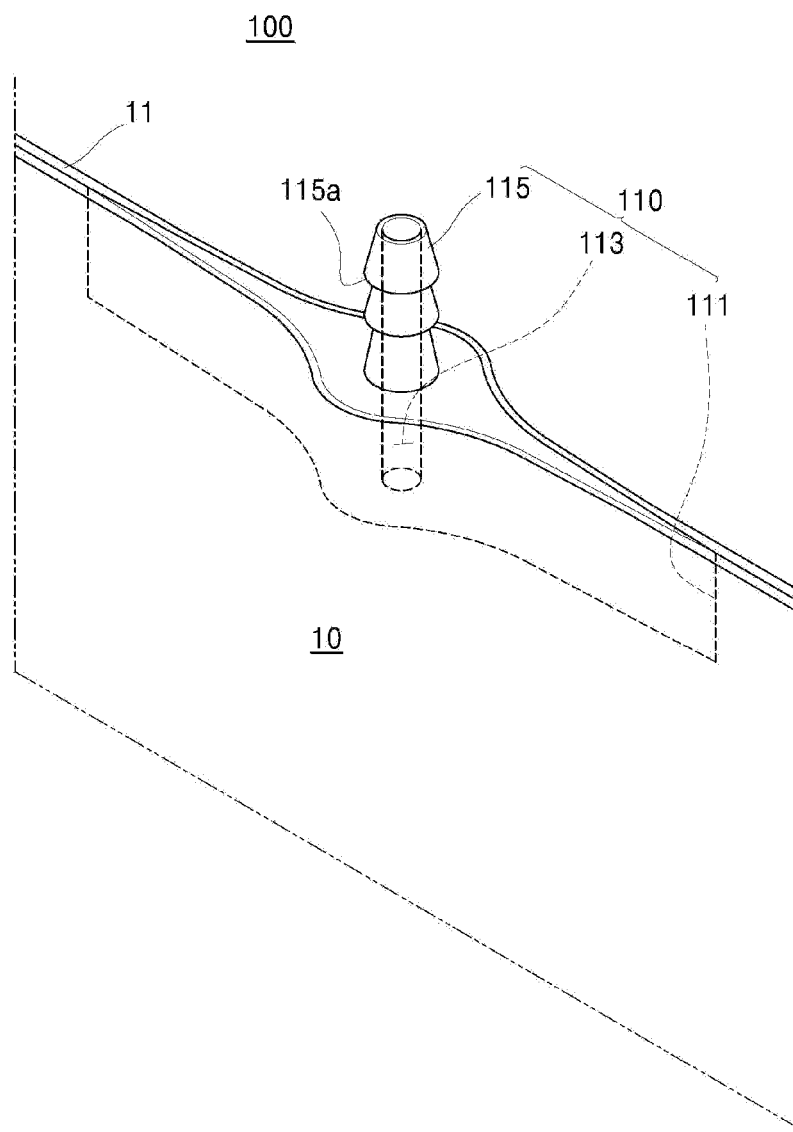
FIG. 3 is a partially enlarged view showing the pouch type lithium secondary battery having a tubular passage structure according to an exemplary embodiment of the present invention.

FIG. 3 is a partially enlarged view showing the pouch type lithium secondary battery having a tubular passage structure according to an exemplary embodiment of the present invention.

Referring to FIG. 3, a detailed configuration of the tubular passage structure 110 in which both surfaces thereof are attached to the sealing part 11 of the pouch 10 to communicate the inner portion of the pouch 10 with the outer portion of the pouch 10 may be confirmed.

The tubular passage structure 110 includes a body part 111, a hollow part 113, and a protruding extension part 115.

The body part 111 is a wing-shaped member inserted between the sealing parts 11 of the pouch 10 to attach both surfaces of the body part to the sealing part.

As an example, the body part 111 may have a shape in which a thickness becomes thinner in a direction of both sides based on the hollow part 113. Accordingly, the body part 111 may be smoothly inserted between the sealing parts 11 of the pouch 10, such that both surfaces of body part 111 may be attached between the sealing parts 11 bonded to each other.

In addition, the body part 111 is possible to be changed in various shapes in addition to the shape shown in FIG. 3.

Description regarding this will be provided in explanation as to FIGS. 8 to 10 to be described below.

The hollow part 113 penetrates through the center of the body part 111, and serves as a passage communicating the inner portion with the outer portion of the pouch.

As a preferable example, the hollow part 113 is preferably formed to have a diameter having a range within 1 mm to 5 mm; however, it is not necessarily limited thereto.

The protruding extension part 115 is a tubular member protruding outwardly of the body part 111, and may have an inner hollow communicated with the hollow part 113.

In addition, the protruding extension part 115 may be connected and fixed to the electrolyte injection line (210 in FIG. 5) that injects an electrolyte into the inner portion of the pouch 10 or may be connected and fixed to the gas discharge line (310 in FIG. 6) that discharges gas to the outer portion of the pouch 10.

Meanwhile, the protruding extension part may further include fixing protrusions 115a formed on an outer peripheral surface thereof.

When the protruding extension part 115 is inserted into the electrolyte injection line (210 in FIG. 5) or the gas discharge line (310 in FIG. 5) to be connected and fixed thereto, the fixing protrusions 115a prevent the lines from being separated and detached unlike the intention of an operator.

To this end, at least one fixing protrusion 115a may be formed in a length direction of an outer peripheral surface of the protruding extension part 115.

As a preferable example, the fixing protrusion may have a plurality of cone-shaped steps each longer than an outer diameter of the protruding extension part 115. Meanwhile, the present invention is not necessarily limited to the above-described shape.

Figure 4A:
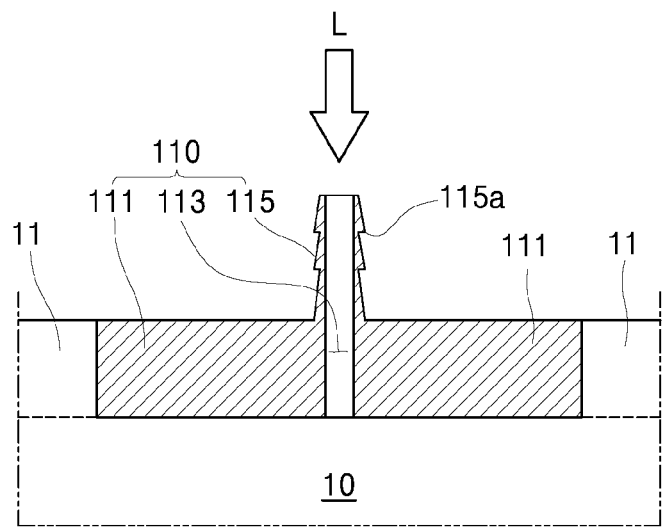
FIGS. 4a and 4b are cross-sectional views schematically showing a state in which the pouch type lithium secondary battery having a tubular passage structure according to an exemplary embodiment of the present invention is operated.
Figure 4B:
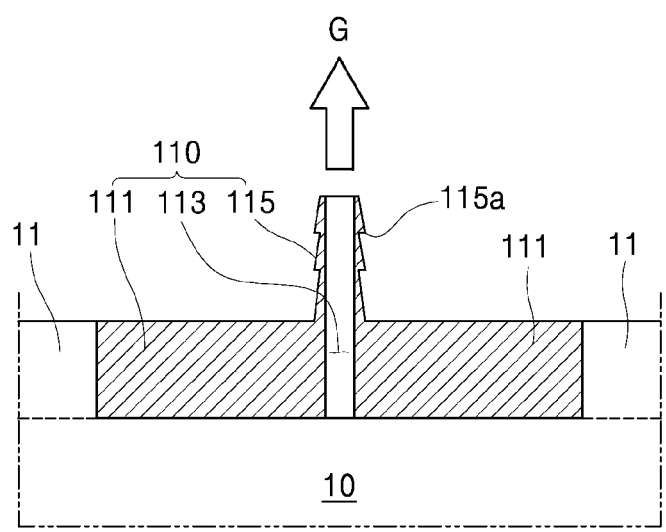

FIGS. 4a and 4b are cross-sectional views schematically showing a state in which the pouch type lithium secondary battery having a tubular passage structure according to an exemplary embodiment of the present invention is operated.

Referring to FIGS. 4a and 4b, the body part 111 of the tubular passage structure 110 may be sealed together in a state in which both surfaces thereof are attached through the sealing part 11 of the pouch 10. According to the above-described structure, the pouch 10 may be entirely sealed except for the hollow part 113 communicating the inner portion with the outer portion of the pouch 10.

FIG. 4a is a conceptual diagram showing a process in which the electrolyte L is injected into the inner portion of the pouch 10. As described above, the electrolyte L supplied from the outer portion of the pouch 10 may be inserted into the inner portion of the pouch 10 through the hollow part 113 of the tubular passage structure 110.

FIG. 4b is a conceptual diagram showing a process in which the gas G generated by deterioration phenomenon, and the like, is discharged to the outer portion of the pouch 10. As described above, the gas G generated from the inner portion of the pouch 10 may be discharged to the outer portion of the pouch 10 through the hollow part 113 of the tubular passage structure 110.

Meanwhile, the protruding extension part 115 shown in FIGS. 4a and 4b may protrude outwardly of the pouch 10.

The protruding extension part 115 may be connected to the electrolyte injection line (210 in FIG. 5) at the time of injecting the electrolyte L, and may be connected to the gas discharge line (310 in FIG. 6) at the time of discharging the gas G.

In addition, the protruding extension part 115 further includes fixing protrusions 115a through the outer peripheral surface thereof, and the fixing protrusion 115a prevents the electrolyte injection line (210 in FIG. 5) or the gas discharge line (310 in FIG. 6) connected to the protruding extension part 115 from being separated and detached.

FIG. 5 is a process diagram schematically showing a process in which an electrolyte is injected into the pouch type lithium secondary battery having a tubular passage structure according to an exemplary embodiment of the present invention.

Referring to FIG. 5, an electrolyte injection part 200 for injecting the electrolyte L into the inner portion of the pouch 10 may be provided. In addition, the electrolyte injection line 210 in which the electrolyte L is supplied may be connected between the electrolyte injection part 200 and the protruding extension part 115 of the tubular passage structure 110.

In accordance with the above-described scheme, the pouch 10 may be maintained in a state in which the pouch 10 is entirely sealed, except for the hollow part of the tubular passage structure 110 into which the electrolyte L is inserted.

As a result, when the tubular passage structure 110 is used, the electrolyte may be injected while continuously maintaining the state in which the pouch 10 is sealed from the outer portion thereof.

Accordingly, uniformity of an injected amount of the electrolyte may be secured, and air, foreign materials, moisture, and the like, from the outer portion of the pouch may be prevented from being introduced into the inner portion of the pouch.

In addition, in a process of injecting the electrolyte, the electrolyte that may remain in a portion which is not included in a final cell may be minimized to provide uniform production capacity. Further, sealing defect occurrence of a resealing region caused by the residual electrolyte may be suppressed.

Figure 6:
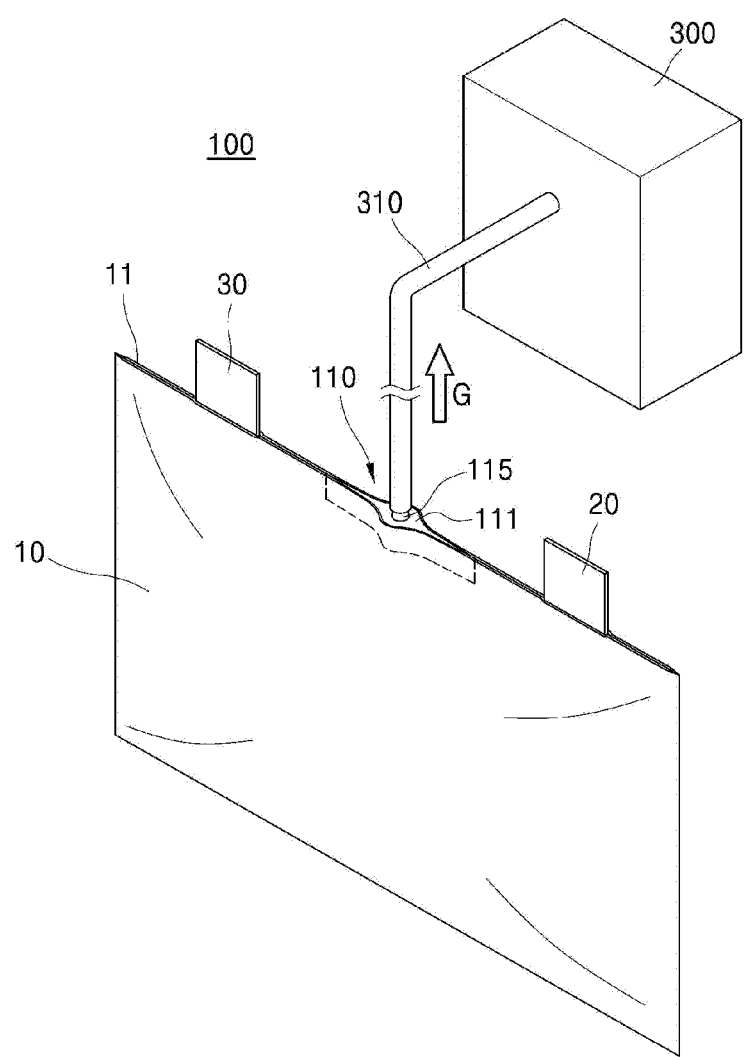
FIG. 6 is a process diagram schematically showing a process in which gas is discharged from the pouch type lithium secondary battery having a tubular passage structure according to an exemplary embodiment of the present invention.

FIG. 6 is a process diagram schematically showing a process in which gas is discharged from the pouch type lithium secondary battery having a tubular passage structure according to an exemplary embodiment of the present invention.

Referring to FIG. 6, a vacuum pump 300 for discharging gas G generated by deterioration phenomenon, and the like, from the inner portion of the pouch 10 to the outer portion of the pouch, may be provided. In addition, the gas discharge line 310 for discharging gas G to the outer portion may be connected between the vacuum pump 300 and the protruding extension part 115 of the tubular passage structure 110.

In accordance with the above-described scheme, gas G generated from the inner portion of the pouch 10 may be effectively discharged while maintaining the state in which the pouch 10 is entirely sealed.

For example, gas G generated after pre-charge of the pouch type lithium secondary battery 100 may be smoothly discharged to the outer portion of the pouch 10 at the time of using the tubular passage structure 110.

More preferably, a degassing process may be performed by connecting the vacuum pump 300 to the tubular passage structure 110. In this case, only the corresponding part of the cell is possible to be in a vacuum state to perform the degassing process, thereby reducing loss as compared to the existing method in which the entire chamber needs to be in a vacuum state to perform the degassing process.

Figure 7:
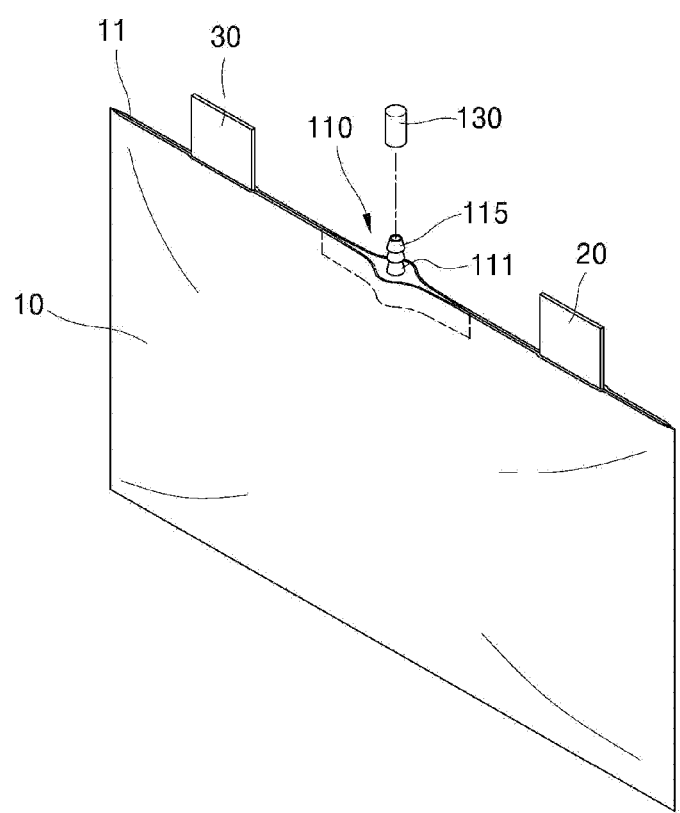
FIG. 7 is a process diagram schematically showing a process in which a locking member is fasten to the pouch type lithium secondary battery having a tubular passage structure according to an exemplary embodiment of the present invention.

FIG. 7 is a process diagram schematically showing a process in which a locking member is fasten to the pouch type lithium secondary battery having a tubular passage structure according to an exemplary embodiment of the present invention.

Referring to FIG. 7, when there is no need to inject the electrolyte into the pouch type lithium secondary battery 100 or to discharge gas, the hollow part in an open state may be closed by fastening the locking member 130 to the tubular passage structure 110, particularly, to the protruding extension part 115 of the tubular passage structure 110.

Figure 8:
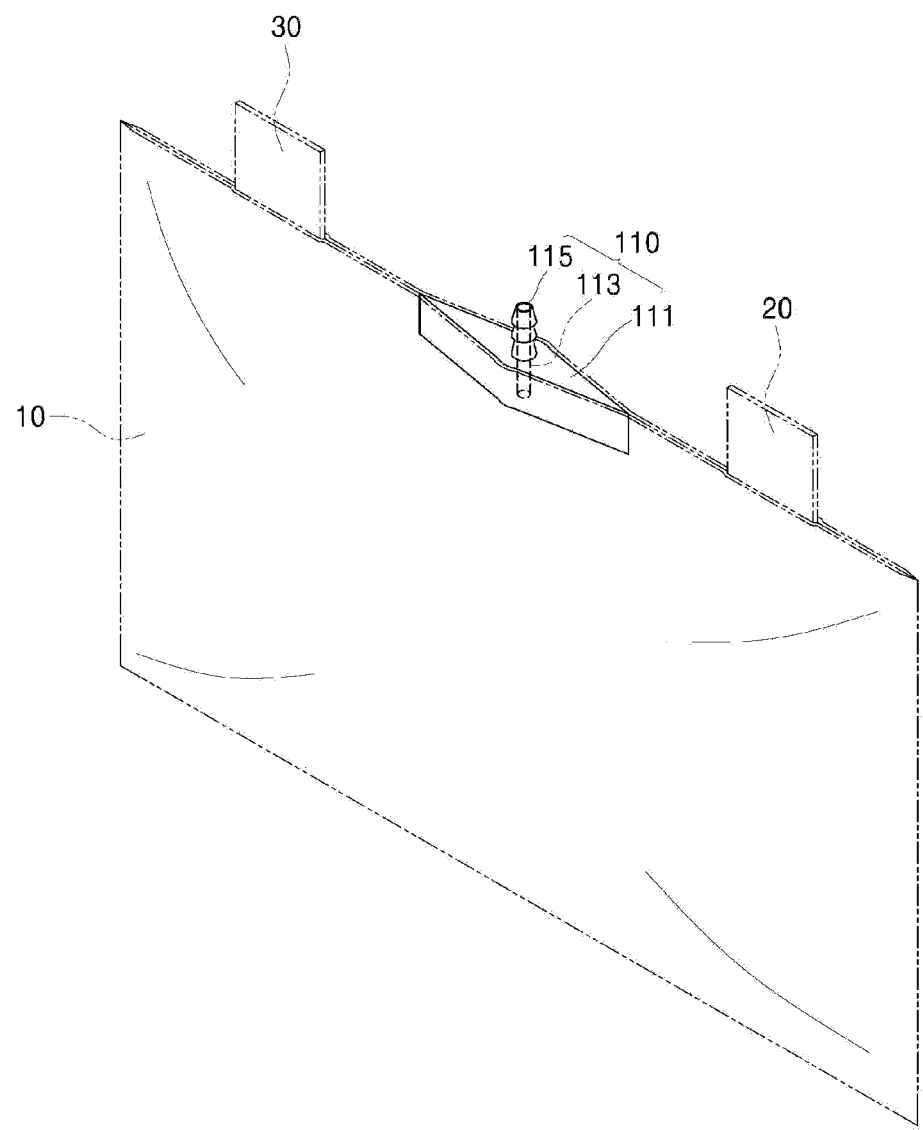
FIGS. 8 and 9 are perspective views each schematically showing a pouch type lithium secondary battery having a tubular passage structure according to another exemplary embodiment of the present invention.
Figure 9:
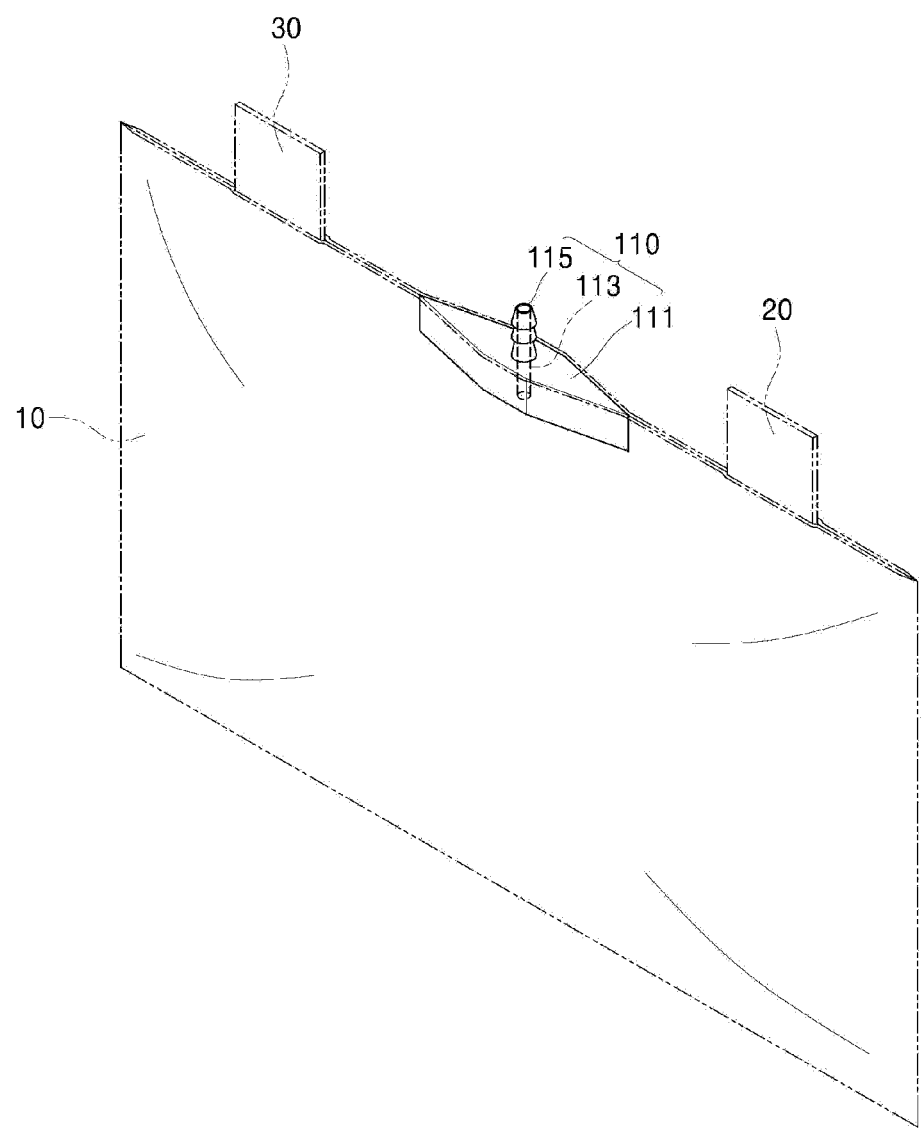

FIGS. 8 and 9 are perspective views each schematically showing a pouch type lithium secondary battery having a tubular passage structure according to another exemplary embodiment of the present invention.

Referring to FIG. 8, it may be confirmed that shapes of the hollow part 113 and the protruding extension part 115 among detailed configuration of the tubular passage structure 110 are the same as described above; however, the shape of the body part 111 is changed. That is, the body part 111 shown in FIG. 8 has a cross-sectional shape in which a thickness becomes narrower obliquely toward both side ends, that is, a cross-sectional shape similar to rhombus.

Unlike this, referring to FIG. 9, the center of the body part 111 with the hollow part 113 formed therein may have a square cross-sectional shape, and a shape in which a thickness becomes narrower obliquely toward both side ends from the center of the body part 111.

In addition to this, although not shown, the cross-sectional shape of the body part 111 may be provided in various shapes in which the body part 111 is inserted between the sealing parts of the pouch 10 to attach both surfaces of the body part to the sealing part.

Figure 10A:
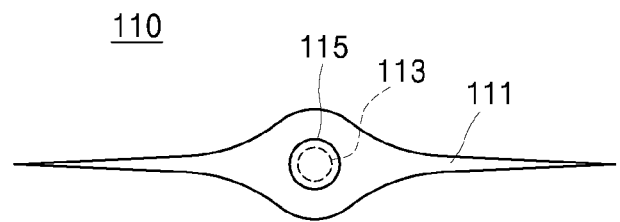
FIGS. 10a, 10b, and 10c are cross-sectional views showing tubular passage structures according to various exemplary embodiments of the present invention.
Figure 10B:
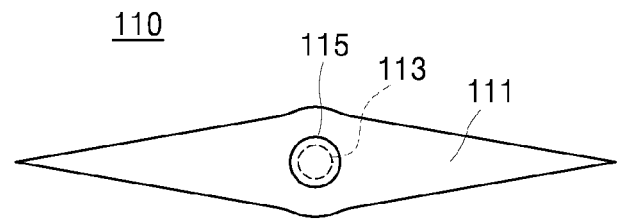
Figure 10C:
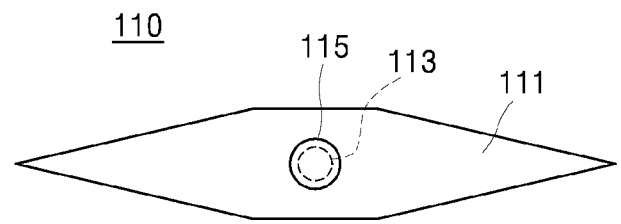

FIGS. 10a, 10b, and 10c are cross-sectional views showing tubular passage structures according to various exemplary embodiments of the present invention.

Referring to FIGS. 10a, 10b, and 10c, cross sections of the tubular passage structure 110 including the body part 111, the hollow part 113, and the protruding extension part 115 are shown.

First, referring to FIG. 10a, the center of the body part 111 is formed in a circular cross section, and the body part has a cross-sectional shape in which a thickness becomes thinner toward both side ends from the center of the body part 111 while being rounded.

Next, referring to FIG. 10b, the center of the body part 111 is formed in a circular cross section, and the body part has a rhombus-like cross-sectional shape in which a thickness becomes thinner obliquely toward both side ends from the center of the body part 111.

Next, referring to FIG. 10c, the center of the body part 111 is formed in a square cross section, and the body part has a shape in which a thickness becomes thinner obliquely toward both side ends from the center of the body part 111. In addition to this, although not shown, the cross-sectional shape of the body part 111 may be provided in various shapes.

As described above, according to the configuration and function of the present invention, the manufacturing process of the pouch type lithium secondary battery may be simplified, and maintenance and repairing in the long term may be performed to improve performance of the pouch type lithium secondary battery.

For example, since the gas chamber is not required, a process of forming and manufacturing of the gas chamber may be omitted, and a piercing process in degassing is not required, which contributes to reduction of defects. In addition, a resealing process may be excluded to improve working time and working efficiency.

Further, the tubular passage structure may be used to inject an electrolyte while maintaining a state in which the entire surface of the pouch is sealed from the outside.

For example, uniformity of an injected amount of the electrolyte may be secured, and air, foreign materials, moisture, and the like, from the outer portion of the pouch may be prevented from being introduced into the inner portion of the pouch. In addition, in a process of injecting the electrolyte, the electrolyte that may remain in a portion which is not included in a final cell may be minimized to provide uniform production capacity. Further, sealing defect occurrence of a resealing region caused by the residual electrolyte may be suppressed.

In addition, gas generated after precharge of the pouch type lithium secondary battery may be properly discharged to the outer portion of the pouch, by using the tubular passage structure.

For example, the degassing process may be performed by directly connecting vacuum pump to the tubular passage structure. In this case, only the corresponding part of the cell is possible to be in a vacuum state to perform the degassing process, thereby reducing loss as compared to the existing method in which the entire chamber needs to be in a vacuum state to perform the degassing process.

Further, maintenance and repairing in the long term may be performed on the pouch type lithium secondary battery.

Hereinabove, although the pouch type lithium secondary battery having a tubular passage structure has been described, it is obvious to those skilled in the art that various modifications, alterations, and changes may be made without departing from the scope of the present invention.

It should be construed that the above-described exemplary embodiments of the present invention have been disclosed for illustrative purposes, and the present invention is not limited thereto. In addition, it should be interpreted that the scope of the present invention is defined by the following claims rather than the above-mentioned detailed description, and all modifications or alterations deduced from the meaning, the scope, and equivalences of the claims are included in the scope of the present invention.

DETAILED DESCRIPTION OF MAIN ELEMENTS

L: Electrolyte
G: Gas
10: Pouch (or Pouch packing material)
11: Sealing part
20, 30: Electrode tab
100: Pouch type lithium secondary battery having tubular passage structure
110: Tubular passage structure
111: Body part
113: Hollow part
115: Protruding extension part
115a: Fixing protrusion
200: Electrolyte injection part
210: Electrolyte injection line
300: Vacuum pump
310: Gas discharge line

The invention claimed is:

1. A pouch type lithium secondary battery having a tubular passage structure, comprising:
   a tubular passage structure having a passage of injecting an electrolyte from an outer portion of a pouch and discharging gas from an inner portion of the pouch by communicating the inner portion of the pouch with the outer portion of the pouch,
   wherein the tubular passage structure includes:
      a wing-shaped body part inserted between sealing parts of the pouch to attach both surfaces of the body part to the sealing part; and
      a hollow part penetrated through the body part to communicate the inner portion of the pouch with the outer portion of the pouch.

2. The pouch type lithium secondary battery having a tubular passage structure of claim 1, wherein at least one tubular passage structure is included in a sealing part of the pouch.

3. The pouch type lithium secondary battery having a tubular passage structure of claim 1, wherein the tubular passage structure is positioned among a plurality of electrode tabs.

4. The pouch type lithium secondary battery having a tubular passage structure of claim 1, further comprising:
   a locking member controlling opening and closing of the tubular passage structure.

5. The pouch type lithium secondary battery having a tubular passage structure of claim 1, further comprising:
   a protruding extension part protruding outwardly of the body part and having an inner hollow communicated with the hollow part.

6. The pouch type lithium secondary battery having a tubular passage structure of claim 5, wherein the protruding extension part is connected and fixed to an electrolyte injection line that injects an electrolyte into the inner portion of the pouch, or is connected and fixed to a gas discharge line that discharges gas to the outer portion of the pouch.

7. The pouch type lithium secondary battery having a tubular passage structure of claim 6, wherein the protruding extension part includes fixing protrusions formed on an outer peripheral surface thereof, and the fixing protrusion has a structure in which the protruding extension part inserted into the electrolyte injection line or the gas discharge line is prevented from being separated and detached.

8. The pouch type lithium secondary battery having a tubular passage structure of claim 7, wherein at least one fixing protrusion is included in a length direction of the protruding extension part, and has cone-shaped steps each longer than an outer diameter of the protruding extension part.

* * * * *